June 25, 1968 G. J. EHALT 3,390,385

MAGNETIC DRUM RECORDING APPARATUS WITH REPLACEABLE SLEEVE

Filed Feb. 1, 1966

INVENTOR
GREGORY J. EHALT

BY Joseph A. Speldrich
AGENT

United States Patent Office 3,390,385

Patented June 25, 1968

3,390,385
MAGNETIC DRUM RECORDING APPARATUS WITH REPLACEABLE SLEEVE

Gregory J. Ehalt, Long Lake, Minn., assignor to Sperry Rand Corporation, New York, N.Y., a corporation of Delaware Filed Feb. 1, 1966, Ser. No. 524,267
6 Claims. (Cl. 340—174.1)

The present invention relates generally to magnetic recording apparatus and more particularly to interchangeable recording surface members utilized therewith.

It is well known in the electronic data processing art to utilize a magnetizable recording medium for receiving large masses of information and storing it until required for later use. One such magnetizable medium is a magnetic drum which may be employed as a mass storage means for a computer. A transducer assembly, serving as a read-write head, is adapted to receive information to be stored or written in the form of a magnetized pattern on a portion of the drum, with the transducers being disposed in a longitudinally aligned and spaced relationship with respect to a recording track.

Because of today's requirements for large data processing systems having application in industry, defense, and the like, huge memory requirements are exacted. Accordingly, present day data processing systems utilize the extensive mass storage capabilities of the magnetic drum. The drum surface, on which data is recorded, is rotated or moved at high speeds. As a selected area, such as the recording track or tracks pass in proximity to transducer members, information is read into or out of the recording surface by means of the transducer members which are provided with signal means through which information or data is transmitted. A read-write head or transducer should, for optimum performance, be located and maintained in a predetermined spaced position relative to the moving recording surface. Once positioned in a proper spaced position, that is, the position relative to the moving recording surface, the head should be for optimum performance maintained in its flying position regardless of surface irregularities, eccentricities, or warpage of the drum. The forces generated in the boundary layer of air between the flying head and the drum caused by relative motion of the moving surface and the head maintains the latter in the predetermined spaced position recording surface. A force produced by the air boundary is generally resisted by a force of a load spring that tends to merge the head in contact with the drum. Force produced by the air in the boundary layer and the forces exerted by the load spring must be properly balanced in order to provide proper and efficient operation.

In the past, magnetic drums were constructed of a single unit by machine operations, for example, wherein solid materials such as aluminum, and the like were turned in order to provide a smooth surface subsequently coated with a magnetizable material. In those configurations the magnetic recording surface, obviously, was maintained in a nonremovable relationship with respect to the drum core. That is, the recording surface was an integral portion of the entire magnetic drum assembly. Even though the magnetic drums have large storage capabilities, in modern day electronic data processing systems a single magnetic drum assembly with its storage capabilities may not meet the requirements of increased capacity demands. Accordingly, in order to accommodate increased memory requirements, multiple drums must be utilized which consequently result in multiple cost for that of a single drum. While it is possible to utilize more than one drum to achieve the greater storage capacity, the attendant cost factors of multiple drums add significantly to the overall cost of mass recording techniques. That is to say, as multiple drum systems are utilized, effective bit costs remain at a significantly high level. Therefore, in order to reduce the effective bit cost of data storage, a novel removable sleeve type magnetic recording shell or surface has been designed in order to provide interchange capability of mass storage devices utilizing a common mounting which will maintain bit costs at a level depending only upon the cost of multiple recording sleeves rather than the multiple costs of complete drum systems.

Briefly, the present invention relates to magnetic drum recording apparatus utilizing a novel magnetic recording sleeve utilized in combination with a mounting or mandrel means. As typified by one embodiment, a rotatable mandrel supporting the magnetic sleeve has formed internally thereof an evacuation chamber with radially projecting spoke ports extending through the periphery of the mandrel surface. A recording sleeve is adapted to be received over the external portion of the mandrel. Evacuation of the chamber and ports effectively creates a vacuum or imbalance of pressure between the inner and outer surfaces of the magnetic recording sleeve thereby securing the sleeve in position upon the mandrel.

As illustrated by another embodiment, the mandrel contains a continuous groove on its outer surface adapted to receive a pressurizable or inflatable tube. The tube is depressurized for assembling and removing the magnetic recording sleeve. By pressurizing the tube, force is exerted upon the internal periphery of the sleeve in a manner to maintain the recording sleeve in position upon the mandrel.

In another configuration, the mandrel is afforded with densely packed bristle-like projections which lie relatively flat on the mandrel surface when the mandrel is in a nonrotating condition, but which extend outward when the mandrel is rotating as a result of centrifugal forces exerted. The extensions of the bristles apply a force against the internal periphery of the recording sleeve in order to maintain the sleeve in position upon the rotating mandrel. The extension of the bristles represents the equivalent of a uniform expansion of the mandrel produced, for example, by adjustable projections seated in the mandrel. The equivalent expansion of the mandrel in combination with the frictional effect produced by the bristle ends serves to secure the sleeve.

As typified by another embodiment, the mandrel is oriented in a vertical position with the removal sleeve inserted internally thereof. In this configuration, the recording sleeve is of a flexible nature such that when inserted into the mandrel, it is held in a positioned relationship against the internal surface of the rotating mandrel. Magnetic recording heads may be disposed within the mandrel chamber.

Accordingly it is a primary object of the present invention to provide an improved magnetic recording apparatus.

It is another object of the present invention to provide a compact, reliable and inexpensive interchangeable mass storage means.

It is an additional object of the present invention to provide a removable magnetic recording surface for use with a basic mounting member.

It is a further object of the present invention to provide a recording surface mounted upon a rotatable and evacuatable mandrel.

It is a yet further object of the present invention to provide a removable sleeve upon a rotatable mandrel wherein pressurized tubing located within grooves around the periphery of the mandrel apply force to the internal surface of the recording sleeve for maintaining same in position on the mandrel.

A still further object of the present invention is to provide a removable recording surface upon a rotatable mandrel containing brush-like extensions whereupon centrifugal forces exerted by the rotating mandrel to an internal surface of the recording sleeve for maintaining same in position on the mandrel.

A yet further object of the present invention is to provide a vertically disposed rotatable mandrel accommodated to receive internally thereof a flexible recording sleeve maintained in contact with an internal periphery of the rotatable mandrel.

These and other more detailed objects of the invention will be more evident by the specification and drawings, in which.

Figure 1:
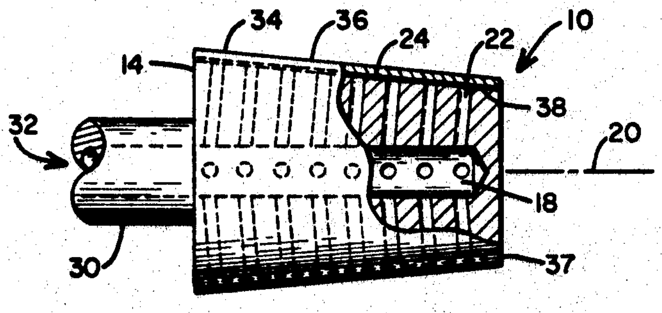
FIGURE 1 illustrates a partially cut away view of the magnetic drum recording apparatus utilizing a removable recording sleeve positioned upon an evacuatable mandrel.
Figure 2:
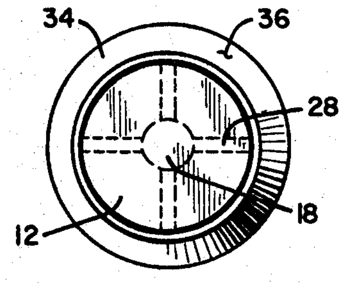
FIGURE 2 is an end view taken along lines 2—2 of FIGURE 1.

Referring now to FIGURE 1, a magnetic drum apparatus 10 consists of a mandrel or hub 12 constructed of a material such as aluminum, or other material which exhibits suitable strength, rigidity, weight and machinability characteristics. Preferably, although not necessarily limited thereto, the mandrel 12 has a taper from end surface 14 to end surface 16. That is, the mandrel has a gradually diminishing diameter from one end to the other, the reasons for which will be explained below. Centrally disposed of the mandrel is a large main chamber or hollowed-out area 18 symmetrically disposed around the axis of rotation 20. Projecting radially therefrom and along the chamber length are radial ports 22 communicating with the main chamber 18 and opening to the external periphery 24 of the mandrel. As illustrated in FIGURE 2, there are represented the plurality of spoked ports 22. In order to provide an equal pressure distribution to a recording sleeve 34 to be explained below, the ports of each row are preferably staggered along the axis of the mandrel with respect to ports 22 of adjacent rows. In this manner, a relatively even pressure distribution is created. However, at the same time, there would be no objection to aligning the radial ports, for example ports 28, in FIGURE 2, to a single plane as viewed from FIGURE 1.

Secured to end 14 of the mandrel by bolts and the like is shaft 30. Any suitable manner of sealing attachment may be utilized. Shaft 30 in turn coupled to a driving source (not shown) has a hollow interior or chamber 32 opening into and communicating with main chamber 18 of the mandrel.

The mandrel 12 is adapted to receive upon its exterior surface 24, a recording sleeve member 34. The sleeve is characterized by a shell-like configuration having a coating of magnetizable material upon its external peripheral surface 36. The sleeve member 34 also is tapered, that is, has a gradually diminishing diameter similar to a truncated cone but has dimensions slightly larger than those of the mandrel. The sleeve may take the form of an open ended truncated cone or alternatively may be provided with a closed end 37. It may be preferable to utilize a closed end 37 to reduce vacuum losses.

As stated above, the mandrel 12 similarly has a gradually reducing diameter. One reason for the spoke ports becoming shorter toward the smallest diameter end of the mandrel is that the vacuum induced through the shaft chamber 32 and chamber 18 and port regions 22 decreases from the largest diameter end to the smallest diameter end of the mandrel. Accordingly by the provision of gradually shorter ports 22, the vacuum throughout the entire chamber and port areas can be maintained relatively constant. Additionally, the tapered configuration of the mandrel and sleeve greatly facilitate interchangeability of one sleeve with another. For example, the large diameter end of the sleeve accommodates the minimum clearance with the mandrel at its largest diameter end thereby permitting very rapid insertion and removal of the sleeve.

The vacuum is induced into the system through a vacuum source (not shown) suitably connected to the drive shaft 30. The placement of the recording sleeve 34 over the mandrel 12 creates a vacuum imbalance or pressure differential across the recording sleeve 34. That is, vacuum on the internal periphery 38 of the sleeve 34 maintains the sleeve in position upon the mandrel by the effect of external atmospheric pressure on the external peripheral surface 36.

To provide the interchangeability feature of the present invention, the vacuum is merely terminated and the sleeve removed and replaced with another.

As an alternative to decreasing the port lengths, the mandrel and sleeve could be designed with a constant diameter. The ports 22 proceeding from end 14 to end 16 of the mandrel are made increasingly larger to maintain a substantially constant vacuum at all points in the system. The alternative has advantages from the standpoint of reducing manufacturing costs for fabricating both the mandrel and sleeve while incurring no extra costs for accommodating larger diameter constant length ports in the mandrel 12, or the ports may even all be of the same diameter which would cause no real significant detrimental effect as respects vacuum distribution. The rows of ports may, as aforementioned, be staggered with respect to each other for enhancing better pressure distribution.

Figure 3:
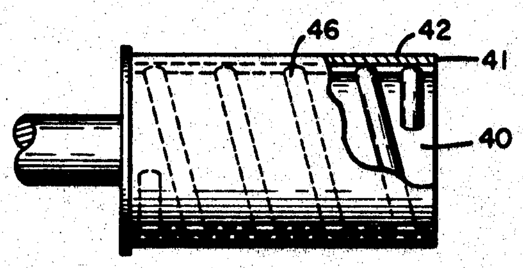
FIGURE 3 illustrates magnetic recording apparatus of a second embodiment utilizing a removable magnetic recording sleeve member maintained in position upon the mandrel by the use of inflatable tubes.
Figure 4:
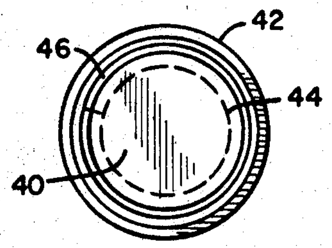
FIGURE 4 is an end view taken along lines 4—4 of FIGURE 1.

Referring to FIGURES 3 and 4, there is illustrated a second embodiment of the present invention utilizing a mandrel 40 and sleeve 42 having a constant diameter or radius. In this embodiment, the principle of vacuum holding is deleted. Instead the mandrel which may either be a solid member or hollowed out to form a shell, provided that requisite strength, rigidity, and weight requirements are achieved, is provided with a continuous groove or channel 44 extending around the external periphery of the mandrel. Accommodated with the continuous groove 44 is disposed an inflatable tube means 46 provided with suitable hookup means to a pressurizing source and vent means (both not shown) for releasing the pressure contained therewithin to permit replacement of the memory sleeve with another. Likewise in the present embodiment, the sleeve 42 may be accommodated with an end wall 41, although the sleeve may with equal facility represent an open ended cylinder.

It is evident that the memory sleeve can be inserted over the mandrel and continuous tubing with facility by venting the tube. After disposing another sleeve over the mandrel and tubing, the tube is pressurized whereby the tubing is forced against the internal periphery of the sleeve and maintains same in position upon the mandrel.

The embodiment illustrated in FIGURES 3 and 4 may be thought of as the inverse of the embodiment illustrated in FIGURES 1 and 2 to the extent that the latter maintains the sleeve in position by the application of a vacuum across the memory sleeve while in the former embodiment, internal pressure from the pressurized tubing exerts the force against the sleeve for maintaining the sleeve in nonrelative motion with respect to the mandrel.

Figure 5:
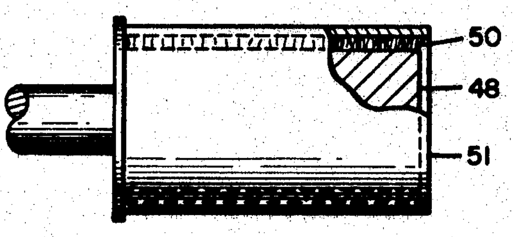
FIGURE 5 illustrates another embodiment of magnetic recording apparatus utilizing a removable magnetic recording sleeve maintained in position upon a rotating mandrel mounting bristle-like projections.
Figure 6:
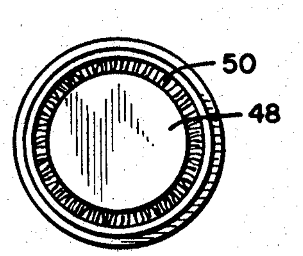
FIGURE 6 is an end view taken along lines 6—6 of FIGURE 5.

By way of reference to FIGURES 5 and 6, there is shown another embodiment of the present invention wherein the mandrel 48 which, as in FIGURE 3 and 4, is of constant diameter and may be either a solid member or hollowed out. In this embodiment the mandrel 48 is provided with densely packed bristle-like projections 50 having one end embedded in the external peripheral surface of the mandrel. Preferably the bristles are of such material and physical dimensions that they lie flat or at least at some angle substantially less than 90° to the peripheral surface of the mandrel in its nonrotating condition but which extend substantially upwardly and outwardly due to centrifugal force when the mandrel is rotating. Extension of the bristles serves to exert force against the internal peripheral surface of the recording sleeve for maintaining same in position upon the mandrel. Again the sleeve may have an end wall 51 or remain as an open ended cylinder.

The extension of the bristles represents the equivalent of expanding the mandrel which could alternatively be accomplished through adjustable raising and lowering blocks associated with the mandrel much like a machine holding chuck for contacting the internal periphery of the recording sleeve. By densely packing the bristles on the mandrel a substantially even force distribution can be maintained against the sleeve member. For removal purposes, when the rotation of the mandrel is terminated, the memory sleeve is easily removed from over the bristles. In the nonrotatable condition, the bristles lie relatively flat as compared to their extended position due to the centrifugal force created by the spinning mandrel.

Figure 7:
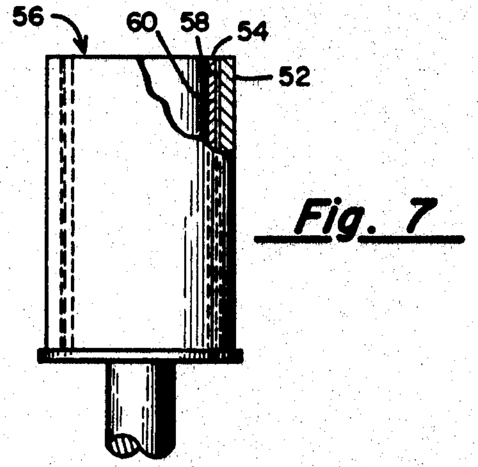
FIGURE 7 illustrates another embodiment of the present invention utilizing a removable magnetic recording sleeve element received internally of a vertically disposed rotatable mandrel.
Figure 8:
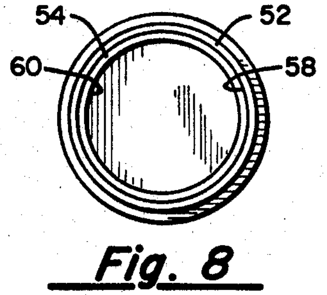
FIGURE 8 is an end view taken along lines 8—8 of FIGURE 7.

By way of reference to FIGURES 7 and 8, another embodiment of the present invention is illustrated. The mandrel 52 is oriented in a vertical position as shown. A flexible memory sleeve 54 is inserted within the mandrel through an opening 56 at one end. In its rotating condition, the flexible sleeve is maintained in contact with the internal periphery 58 of the mandrel due to the effect of centrifugal forces tending to expand the flexible sleeve. The magnetizable surface is disposed upon the internal surface 60 of the flexible sleeve. That is, that surface in non-contacting relationship with respect to surface 58 of the mandrel. During rotation of mandrel 52, the flexible characteristics of the sleeve permit its contact with the mandrel whereupon the mandrel and sleeve have a nonrotatable relationship with respect to each other.

In each of the embodiments illustrated in FIGURES 1–6, conventional head mounting, adjusting, and pick-up means may be utilized. In the embodiment illustrated in FIGURES 7 and 8, on the other hand, where the recording surface is located on the internal periphery 60 of the recording sleeve, the heads and related apparatus are received within the opening 56. As a result recording and reproduction is effected internally of the apparatus.

It is to be noted that in each of the embodiments illustrated in FIGURES 1–8, a recording sleeve is secured in position upon a rotatable mandrel by one principle or another. However, in each is the common denominator that when the mandrel is in its rotating condition there is no relative movement between the recording sleeve and the mandrel. Both members rotate as a single entity, which, as is obvious, is a basic requirement. While one particular structural arrangement may have advantages over another, all represent a significant step forward in providing memory sleeve interchange capability for substantial reduction in bit costs. Whereas in the use of multiple drum systems all drum and logic circuitry was necessarily duplicated, this significant disadvantage is completely obviated with the present novel embodiments.

Additional geometric configurations of the sleeve and mandrel may be used as well. Also various methods of securing the recording sleeve to the mandrel may be utilized. For example, the sleeve could be bolted or screwed to the mandrel. Likewise the recording sleeve may have integral therewith a key or land, extending, for example, longitudinally thereof whereby the sleeve may be received with its key in a mating longitudinal slot in the mandrel. The key and slot may likewise, for example, be spirally or similarly arranged on the members to assure longitudinal stable positioning during rotation. Additionally, the mandrel may be made to be uniformly expandable to maintain the recording sleeve in position. For example, adjustable raising and lowering blocks associated with the mandrel, much in the form of a machine chuck may be utilized.

It is understood that suitable modifications may be made in the structure and method as disclosed provided that such modifications come within the spirit and scope of the appended claims.

Having now, therefore, fully illustrated and described my invention, what I claim to be new and desire to protect by Letters Patent is:

1. In a magnetic recording-reproducing apparatus where magnetic transducer members record and reproduce from a record surface comprising:

(a) a rotatable mandrel means;

(b) a driving means connected to said mandrel means for effecting rotation thereof;

(c) a separate recording sleeve means having an inner surface and containing on a peripheral surface thereof a magnetizable coating, said sleeve means being adapted to be received by a surface of said rotatable mandrel means; and (d) said rotatable mandrel means supporting pressure means for applying a positive pressure directed outwardly for maintaining said sleeve means and said mandrel means in a non-relative motion relationship with respect to each other when said mandrel means is in a rotating condition.

2. The invention of claim 1 wherein said mandrel means contains a continuously extending groove means on the peripheral surface thereof; an inflatable means seated in said groove for exerting a holding force against said inner surface of said sleeve means opposite a peripheral surface thereof containing the magnetizable coating.

3. The invention of claim 1 wherein said mandrel means has a constant diameter and has a groove means on an external periphery thereof for receiving said pressure means.

4. The invention of claim 3 wherein said pressure means comprises a pressurizable container means disposed in said groove means whereby said container means in a pressurized condition exerts a force on said inner surface of the recording sleeve means opposite a peripheral surface thereof containing the magnetizable coating.

5. The invention of claim 4 wherein said recording sleeve means is an open ended cylinder.

6. The invention of claim 5 wherein said recording sleeve means is a cylinder with one closed end wall.

References Cited

UNITED STATES PATENTS

| | | | |
|---|---|---|---|
| 2,753,181 | 7/1956 | Anander | 340—174.1 |
| 2,668,718 | 2/1954 | Roberts | 179—100.2 |
| 793,140 | 6/1905 | Manwaring | 274—11 |

BERNARD KONICK, *Primary Examiner.*

A. I. NEUSTADT, *Assistant Examiner.*